United States Patent Office 3,451,709
Patented June 24, 1969

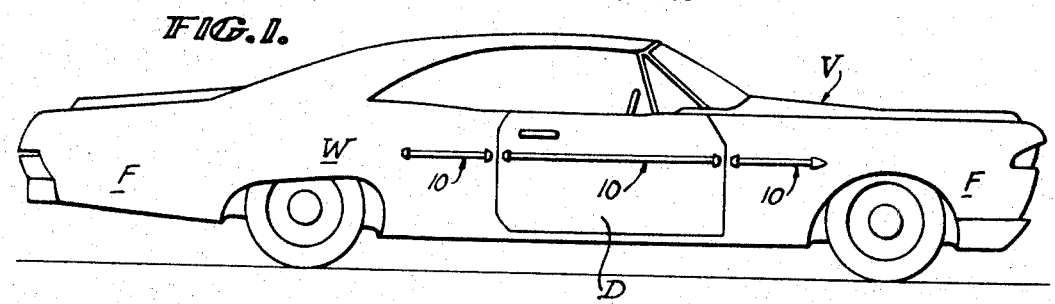

3,451,709
SIDEWALL AND FENDER PROTECTOR
Donald A. Swauger, San Jose, Calif., assignor of fifty-six percent to Fred Beisser, twenty-two percent to Delbert R. Walker, and twenty-two percent to Leward M. Larson, Fort Dodge, Iowa
Filed Oct. 18, 1966, Ser. No. 587,616
Int. Cl. B60r *13/04*
U.S. Cl. 293—1                     1 Claim

ABSTRACT OF THE DISCLOSURE

An extruded hollow bumper strip having a flat solid backwall skirted by side beads providing a recess in which a continuous strip of pressure-sensitive adhesive tape mounted on such backwall is concealed and has an adhesive mounting surface extending slightly beyond the side beads for surface contact with the body of a vehicle.

---

This invention relates to sidewall bumpers for vehicles and more particularly to means for attaching sidewall bumper strips to the vehicle.

As is commonly known, the sidewalls and fenders of a vehicle are most vulnerable to scratches and nicks when the door of an adjacent parked car is opened in a parking area. Most parking places are designed to allow a minimum of space for vehicles, and the proximity of parked cars is such that the spacing between cars is ordinarily less than the width of a car door. Consequently, it is not uncommon to discover many nicks and scratches on the sidewall of any vehicle from engagement thereof by the edge of the door of a car parked adjacent such vehicle.

The use of trim strips and like attachments on the sidewalls and fenders of a vehicle is well known in the art. In many instances, the location of such trim strips by car designers is dictated by aesthetic values rather than the purpose of protecting the sides of the vehicle from becoming marred or scratched. Moreover, such trim strips are usually made a permanent part of the vehicle to which they are applied and any variance from the original design is considered custom finishing usually not allowed by insurance companies.

The prior art is also repleat with vehicle sidewall protectors and in most cases such accessories are constructed for permanent attachment to a vehicle; or, if removable, are so constituted as to require attachment when parking the vehicle and removable when the vehicle doors are to be opened for purpose of entering or leaving the same.

The present invention has as an object the provision of a bumper strip which can be easily applied to a vehicle without the use of tools or alteration of the vehicle itself.

It is another object to provide a vehicle sidewall protector supplied in strips which are cuttable in lengths for any area to be protected. In this regard it is a further object to provide terminal ends for various lengths of such bumper strips to provide a suitable and pleasing appearance to the same.

It is another object to provide vehicle sidewall protectors of extruded material such as metal or plastic and contoured to afford a yieldable cushioning effect, protruding sufficiently to guard against the door of an adjacent vehicle marring or scratching the sidewall of the vehicle to which the bumper strip of the present invention is applied.

It is another object to provide means for securely fastening such sidewall protector to the sidewall of a vehicle without marring or cutting into the same. In this connection it is yet another object to provide such sidewall protector with a continuous strip of adhesive material for securing the sidewall protector to the sidewall of the vehicle.

It is another object to provide the sidewall protector with an intermediate connecting medium having the inherent characteristic to adhere to the sidewall of a vehicle upon contact therewith. In this regard the connecting medium is preferably a continuous strip of pressure-sensitive tape adapted to attract and to adhere to the side wall or fenders of a vehicle.

It is yet another object to provide a bumper strip with a continuous magnetized back surface in an inherent bowed condition such that the ends of such strip tend to bear against a metallic surface to which the magnetized back surface is attracted.

It is another object to provide a side wall protector with open ends and means insertable into such open ends for closing the same to provide ornamental terminal ends thereon.

It is another object to provide such terminal ends with a connecting medium for attracting and attaching such terminal ends to the sidewall and/or fender of a vehicle body.

These and other objects and advantages of the present invention will become apparent from a reading of the following description in the light of the accompanying drawing in which:

FIG. 1 is a side elevational view of a vehicle having a sidewall protector embodying the present invention applied thereto.

FIG. 2 is a bottom edge elevation of a bumper strip in accordance with the present invention.

FIG. 3 is a side elevation of the side wall protector of FIG. 1, and at enlarged scale with respect thereto but foreshortened.

FIG. 4 is a bottom edge elevation of the unit shown in FIG. 3.

FIG. 5 is a cross-section through FIG. 4 taken along line 5—5 thereof.

FIG. 6 is a fragmentary perspective view of one end of the sidewall protector shown in FIG. 2, and at substantially larger scale with respect thereto.

FIG. 7 is a perspective view of a terminal end for the side wall protector of the present invention.

FIG. 8 is a fragmentary longitudinal section through an end of the sidewall protector of FIG. 3 and taken along line 8—8 thereof.

Referring to the drawing, a vehicle sidewall protector generally designated 10 comprises a bumper strip 11 of indeterminate length having a backwall 12 recessed as at 13 to receive a continuous band of adhesive material 14 which comes in rolls like tape. One face of the material 14 is permanently secured in the recess 13 so as to become an integral part of the strip 11.

The material 14 has the inherent characteristic to adhere or cling to the sidewall W or fender F of a vehicle V as shown in FIG. 1. The material 14 may consist of a hard rubber base such as polyurethane of a width and thickness to fit the recess 13 on the backwall 12 of the bumper strip 11. As shown in FIG. 5, the back or exposed surface 22 of the material 14 is disposed slightly beyond the back surface 12 of the strip 11 to assure complete surface contact of the strip with the body B of the vehicle. The present invention contemplates providing the material 14 with an adhesive such as to enable it to stick or cling to the sidewall of a vehicle as placed. It further contemplates the impregnation of the material 14 with magnetized particles of iron oxide which will magnetically attract metal such as the side wall and fenders of a vehicle body. In either case, the exposed surface 22 of the adhesive material 14 is such that upon contact with the body B of a vehicle, it will cling to the same and hold the strip 11 in any desired location thereon.

As best seen in FIG. 5 the strip 11 has an unique configuration in cross section which is decorative in addition to its utilitarian aspects. The strip 11 is an extruded form and may be made of metal although material such as the plastic generally known under the trademark Cycolac or the like is preferable. It may be colored or plated as desired. It is also contemplated that the strip 11 as well as the adhesive tape 14 may be of clear plastic so that the color of the paint on the vehicle itself will reflect and be visible through the transparent materials.

The shape of the bumper strip 11 is such as to provide a main broad base backwall 12 shown at the bottom in FIG. 5. This broad base backwall 12 is skirted by beads 16 and 16' at its sides to form the recess 13 already mentioned. From the side beads 16 and 16' the strip 11 has top and bottom sidewalls 17 and 17' shown at the sides in FIG. 5. These sidewalls 17–17' converge toward a relatively narrower outer or front wall 18 shown at the top in FIG. 5 to support the wall 18 in spaced parallel relation to the surface of the vehicle body to which the bumper strip is attached and to form a hollow core conforming to the shape of the extruded material strip 11.

As best seen in FIG. 2, the bumper strip 11 comes in indeterminate length bowed outwardly relative to the backwall 12 containing the adhesive tape 14. The bowed condition of the strip 11 assures contact of the ends 20 and 21 of such strip with the vehicle body B represented by the lowermost dot-dash line in FIG. 2. Consequently, when the entire length of the strip 11 is pressed into parallel relation to the body B surface contact between the latter and the cohesive material 14 is assured.

As best seen in FIG. 6, each end E of the strip 11 is open, the strip itself being hollow. The open ends E of the strip 11 are closed and/or concealed by terminal ends 25 and 26. These terminal ends 25 and 26 are identical except that the one 26 is dart-like in appearance for use on the forward end of the leading bumper strip 11 as shown in FIG. 1. The other terminal end 25 is foreshortened to provide a blunt end.

Each terminal end 25 and 26 has a reduced male portion 27 conforming to the shape of the open end E of the extruded strip 11 and is adapted to be press fit into either end E as desired. As shown in FIGS. 2, 3, 7 and 8, a portion of the back face of each terminal end 25 and 26 is recessed as at 12' to receive a portion 23 and/or 24 of the tape 14 extending beyond the open end E of the strip 11.

Each of the terminal ends 25 and 26 has a block of adhesive material 28 embedded in its back face. The exposed face of each block of adhesive material 28 is disposed slightly to the rear of the back face of each terminal end 25 and 26 as the case may be to assure complete surface contact between the adhesive block and the body of a vehicle for securing the terminal ends 25 and/or 26 to the vehicle body B. These blocks 28 may be magnetized for attraction to a metal body or may be provided with an adhesive coating or substance adapted to adhere to the body B upon contact therewith.

The exposed surface 22 of the adhesive material 14 is preferably covered with a suitable protective material during nonuse. However, upon removal of such protective covering the cohesive material 14 is of such character as to cling and adhere to a surface upon contact therewith.

While I have described the foregoing bumper strip and means for securing the same to a vehicle body in specific detail it will be appreciated that the same may be susceptible to alteration, variation and/or modification without departing from the spirit or scope of my invention therein.

What I claim as new and desire to protect by Letters Patent is:

1. In a sidewall protector for a vehicle body a bumper strip comprising:
   (a) a length of extruded material having a broad base backwall skirted by a pair of parallel side beads forming a recess therebetween and merging with outwardly extending sidewalls converging into a narrow front wall to thereby form a hollow core and open ends conforming to the shape of the extruded bumper strip;
   (b) a continuous length of adhesive material of a width spanning between said parallel side beads and having one face of said adhesive material permanently secured to said broad base backwall within the recess formed between said side beads;
   (c) said adhesive material having a thickness slightly greater than the depth of the recess formed between said parallel side beads for presenting a vehicle body contacting adhesive back surface on said adhesive material rearwardly of the side beads of said broad base backwall to thereby assure complete surface contact between said adhesive material and the body of a vehicle contacted thereby for securing said bumper strip thereto;
   (d) a terminal end for each open end of such hollow extruded material, each said terminal end having a projection of a shape conforming to the hollow core of said extruded material for press fit into and closing of the open ends thereof; and
   (e) a block of adhesive material embedded in the back face of each of said terminal ends and projecting slightly therefrom for securing the latter to the body of such vehicle concurrently with the continuous length of adhesive material on the back face of the hollow extruded material.

References Cited

UNITED STATES PATENTS

| 2,212,493 | 8/1940 | Brunken | 293—1 |
| 2,959,832 | 11/1960 | Baermann. | |
| 3,147,176 | 9/1964 | Haslam. | |
| 3,290,082 | 12/1966 | Fritsch | 293—1 |
| 3,309,129 | 3/1967 | Newman et al. | 248—345.1 XR |

ROY D. FRAZIER, *Primary Examiner.*

J. FRANKLIN FOSS, *Assistant Examiner.*

U.S. Cl. X.R.

161—161; 248—206, 345.1; 293—62; 296—44